(12) United States Patent
Vernon et al.

(10) Patent No.: US 8,617,022 B1
(45) Date of Patent: Dec. 31, 2013

(54) MULTI-SPEED AUTOMATIC TRANSMISSION

(71) Applicant: Toyota Motor Engineering & Manufacturing North America, Inc., Erlanger, KY (US)

(72) Inventors: Nicholas S. Vernon, Brighton, MI (US); Brian C. Schneidewind, Ann Arbor, MI (US); Sam D. Koch, Ann Arbor, MI (US); Venkat R. Deshpande, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/737,629

(22) Filed: Jan. 9, 2013

(51) Int. Cl.
*F16H 3/62* (2006.01)

(52) U.S. Cl.
USPC .............................. 475/278; 475/284; 475/288

(58) Field of Classification Search
USPC .................. 475/269, 271, 275–292, 311, 323
See application file for complete search history.

(56) References Cited

U.S. PATENT DOCUMENTS

| | | | |
|---|---|---|---|
| 4,976,670 A | 12/1990 | Klemen | |
| 6,176,803 B1 | 1/2001 | Meyer et al. | |
| 6,364,804 B1* | 4/2002 | Haka | 475/278 |
| 6,752,738 B1 | 6/2004 | Martin et al. | |
| 7,226,381 B2 | 6/2007 | Klemen | |
| 7,285,069 B2 | 10/2007 | Klemen | |
| 7,291,084 B2 | 11/2007 | Park | |
| 7,294,087 B2* | 11/2007 | Hayabuchi et al. | 475/276 |
| 7,377,873 B2 | 5/2008 | Shim et al. | |
| 7,396,312 B2 | 7/2008 | Klemen et al. | |
| 7,452,303 B2* | 11/2008 | Seo | 475/284 |
| 7,604,563 B2* | 10/2009 | Phillips | 475/280 |
| 7,611,439 B2* | 11/2009 | Shim | 475/280 |
| 7,749,126 B2 | 7/2010 | Hart et al. | |
| 7,846,057 B2 | 12/2010 | Shim | |
| 7,878,938 B2* | 2/2011 | Choi | 475/275 |
| 7,946,948 B2 | 5/2011 | Phillips et al. | |
| 8,079,932 B2 | 12/2011 | Phillips et al. | |
| 8,088,032 B2* | 1/2012 | Gumpoltsberger et al. | 475/275 |

(Continued)

FOREIGN PATENT DOCUMENTS

| | | |
|---|---|---|
| DE | 41 14 462 | 11/1991 |
| JP | 8-247230 | 9/1996 |

*Primary Examiner* — Derek D Knight
(74) *Attorney, Agent, or Firm* — Oblon, Spivak, McClelland, Maier & Neustadt, L.L.P.

(57) ABSTRACT

An automatic transmission includes a first planetary gear set including a first sun gear, a first pinion, and a ring gear of the first planetary gear set. The transmission includes a second planetary gear set including a second sun gear, a second pinion, and a common gear. The transmission includes a third planetary gear set including a third sun gear, the second pinion, a third pinion, and the common gear. The transmission also includes a fourth planetary gear set including the common gear, a fourth pinion, and a ring gear of the fourth planetary gear set. The second planetary gear set and the third planetary gear set form a Ravigneaux gear set. The fourth planetary gear set is concentrically arranged with the second planetary gear set or the third planetary gear set, and the second and third planetary gear sets are radially inward of the fourth planetary gear set.

14 Claims, 4 Drawing Sheets

(56) References Cited

U.S. PATENT DOCUMENTS

| | | |
|---|---|---|
| 2006/0172850 A1 | 8/2006 | Sung |
| 2008/0039285 A1 | 2/2008 | Park |
| 2009/0233753 A1 | 9/2009 | Seo |
| 2010/0041507 A1 | 2/2010 | Gumpoltsberger et al. |
| 2010/0041508 A1 | 2/2010 | Gumpoltsberger et al. |
| 2010/0041509 A1 | 2/2010 | Gumpoltsberger et al. |
| 2010/0190601 A1 | 7/2010 | Phillips |
| 2010/0331138 A1 | 12/2010 | Phillips |
| 2011/0009229 A1 | 1/2011 | Bauknecht et al. |
| 2011/0124462 A1 | 5/2011 | Meyer et al. |
| 2011/0183807 A1 | 7/2011 | Gumpoltsberger et al. |
| 2011/0306460 A1 | 12/2011 | Haupt et al. |
| 2012/0010038 A1 | 1/2012 | Hart et al. |

\* cited by examiner

Gear Tooth Count

|  | P1 | P2 | P3 | P4 |
|---|---|---|---|---|
| Rho | 0.351 | 0.444 | 0.403 | 0.600 |
| Sun | 26 | 32 | 29 | 84 |
| Ring | 74 | 72 | 72 | 140 |
| Pinion | 24 | 20 | 20 | 28 |
| Pinion |  |  | 20 |  |

Gear Ratio and Ratio Step

Torque-Transmitting Elements: Fourth Fifth Sixth First Second Third

|  | C1 | C2 | C3 | B1 | B2 | B3 | Ratio | Step |
|---|---|---|---|---|---|---|---|---|
| 1 |  | O |  |  | O | O | 4.809 | 1.705 |
| 2 |  | O |  | O |  | O | 2.821 | 1.456 |
| 3 | O | O |  |  |  | O | 1.937 | 1.433 |
| 4 |  | O | O |  |  | O | 1.351 | 1.351 |
| 5 | O | O | O |  |  |  | 1.000 | 1.188 |
| 6 |  | O | O | O |  |  | 0.842 | 1.143 |
| 7 |  | O | O |  | O |  | 0.736 | 1.178 |
| 8 |  |  | O | O | O |  | 0.625 | 1.167 |
| 9 | O |  | O |  | O |  | 0.536 | Total |
| R | O |  |  |  | O | O | -4.358 | 8.977 |

MULTI-SPEED AUTOMATIC TRANSMISSION

BACKGROUND

I. Field of the Disclosure

This disclosure relates generally to an automatic transmission for transmitting a rotation of an input shaft to an output shaft at a speed selected from a plurality of speeds by selectively engaging or disengaging a plurality of torque-transmitting elements.

II. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, a growing demand exists for a multi-speed automatic transmission that provides a plurality of gear ratios suited to a driver's preferences. Automatic transmissions that include six or more speeds, for example, have been proposed to augment vehicle drivability. However, as the number of speeds within these multi-speed automatic transmissions has increased, problems of packaging components within a transmission which hinder assembly of the transmission into a vehicle have arisen.

SUMMARY

It would thus be particularly advantageous to solve packaging difficulties in a multi-speed automatic transmission while improving vehicle fuel efficiency and power transmission performance of the transmission.

To overcome these shortcomings of conventional multi-speed automatic transmissions, this disclosure describes a multi-speed automatic transmission including a structure with a reduced packaging size and low-friction components. The automatic transmission further improves vehicle fuel efficiency by providing a wide gear ratio spread and close gear ratio steps between adjacent gear ratios, to maintain a power supply device in an efficient operating condition. In addition, the automatic transmission provides the close gear ratio steps to enable a more responsive torque demand logic, thus enhancing vehicle drivability.

In an aspect of the disclosure, an automatic transmission includes a first planetary gear set including a first sun gear, a first pinion, and a ring gear of the first planetary gear set. The first sun gear meshes with the first pinion, and the first pinion meshes with the first sun gear and with the ring gear of the first planetary gear set. The transmission includes a second planetary gear set including a second sun gear, a second pinion, and a common gear. The second sun gear meshes with the second pinion, and the second pinion meshes with the second sun gear and with the common gear. The transmission includes a third planetary gear set including a third sun gear, the second pinion, a third pinion, and the common gear. The third sun gear meshes with the third pinion, the third pinion meshes with the third sun gear and with the second pinion, and the second pinion meshes with the third pinion and with the common gear. The transmission also includes a fourth planetary gear set including the common gear, a fourth pinion, and a ring gear of the fourth planetary gear set. The common gear meshes with the fourth pinion, and the fourth pinion meshes with the common gear and with the ring gear of the fourth planetary gear set. The second planetary gear set and the third planetary gear set form a Ravigneaux gear set. The fourth planetary gear set is concentrically arranged with the second planetary gear set or with the third planetary gear set, and the second and third planetary gear sets are radially inward of the fourth planetary gear set.

In the automatic transmission, the first, the second, the third, and the fourth planetary gear sets are each axially arranged on a single axis in the automatic transmission. The first and the second planetary gear sets are separately arranged in respective first and second gear set planes.

An output shaft of the automatic transmission is directly connected to the ring gear of the fourth planetary gear set. In the Ravigneaux gear set, the second pinion is a long pinion and the third pinion is a short pinion. The long pinion is longer in length than the short pinion. A number of gear teeth of the second sun gear is greater than a number of gear teeth of the third sun gear.

The automatic transmission further includes a first planetary carrier, a second planetary carrier, and a third planetary carrier. The first planetary carrier rotatably supports the first pinion. The second planetary carrier rotatably supports the second pinion. The third planetary carrier rotatably supports the fourth pinion.

The automatic transmission also includes a plurality of torque-transmitting elements. A first torque-transmitting element fixes the second sun gear when the first torque-transmitting element is engaged to transmit torque. A second torque-transmitting element fixes the second planetary carrier when the second torque-transmitting element is engaged to transmit torque. A third torque-transmitting element fixes the first sun gear when the third torque-transmitting element is engaged to transmit torque. A fourth torque-transmitting element connects an input shaft of the automatic transmission to the second sun gear when the fourth torque-transmitting element is engaged to transmit torque. A fifth torque-transmitting element connects the input shaft to the third sun gear when the fifth torque-transmitting element is engaged to transmit torque. A sixth torque-transmitting element connects the input shaft to the third planetary carrier when the sixth torque-transmitting element is engaged to transmit torque.

In the automatic transmission, the first, the second, and the third torque-transmitting elements are packaged in a concentric arrangement, and the fourth, the fifth, and the sixth torque-transmitting elements are packaged in a concentric arrangement. Additionally, the first, the second, the third, the fourth, the fifth, and the sixth torque-transmitting elements are packaged outside of a gear train formed by the first, the second, the third, and the fourth planetary gear sets.

Three elements of the first, the second, the third, the fourth, the fifth, and the sixth torque-transmitting elements are engaged at any speed of the automatic transmission. The second, the third, and the fifth torque-transmitting elements are engaged in a first forward gear of the automatic transmission. The first, the third, and the fifth torque-transmitting elements are engaged in a second forward gear of the automatic transmission. The third, the fourth, and the fifth torque-transmitting elements are engaged in a third forward gear of the automatic transmission. The third, the fifth, and the sixth torque-transmitting elements are engaged in a fourth forward gear of the automatic transmission. The fourth, the fifth, and the sixth torque-transmitting elements are engaged in a fifth forward gear of the automatic transmission. The first, the fifth, and the sixth torque-transmitting elements are engaged in a sixth forward gear of the automatic transmission. The second, the fifth, and the sixth torque-transmitting elements are engaged in a seventh forward gear of the automatic transmission. The first, the second, and the sixth torque-transmitting elements are engaged in an eighth forward gear of the automatic transmission. The second, the fourth, and the sixth torque-transmitting elements are engaged in a ninth forward gear of the automatic transmission. In addition, the second, the third, and the fourth torque-transmitting elements are engaged in a reverse gear of the automatic transmission.

The first forward gear includes a highest forward gear ratio of the automatic transmission, while the ninth forward gear includes a lowest forward gear ratio of the automatic transmission. A ratio spread between the highest forward gear ratio and the lowest forward gear ratio is 8.97 in one embodiment. A ratio step between any two immediately adjacent forward gear ratios of the automatic transmission is less than 1.71 and greater than 1.14 in one embodiment.

In another aspect of the disclosure, at least one of the third torque-transmitting element and the fifth torque-transmitting element may be a locking clutch. The locking clutch includes a dog clutch.

The foregoing paragraphs have been provided by way of general introduction, and are not intended to limit the scope of the following claims. The described embodiments, together with precise advantages, will be best understood by reference to the following detailed description taken in conjunction with the accompanying drawings.

BRIEF DESCRIPTION OF THE DRAWINGS

A more complete appreciation of the disclosure and the attendant advantages thereof will be better understood by reference to the accompanying drawings and the subsequent detailed description, where.

DETAILED DESCRIPTION OF THE ILLUSTRATIVE EMBODIMENTS

Figures 1, 2:
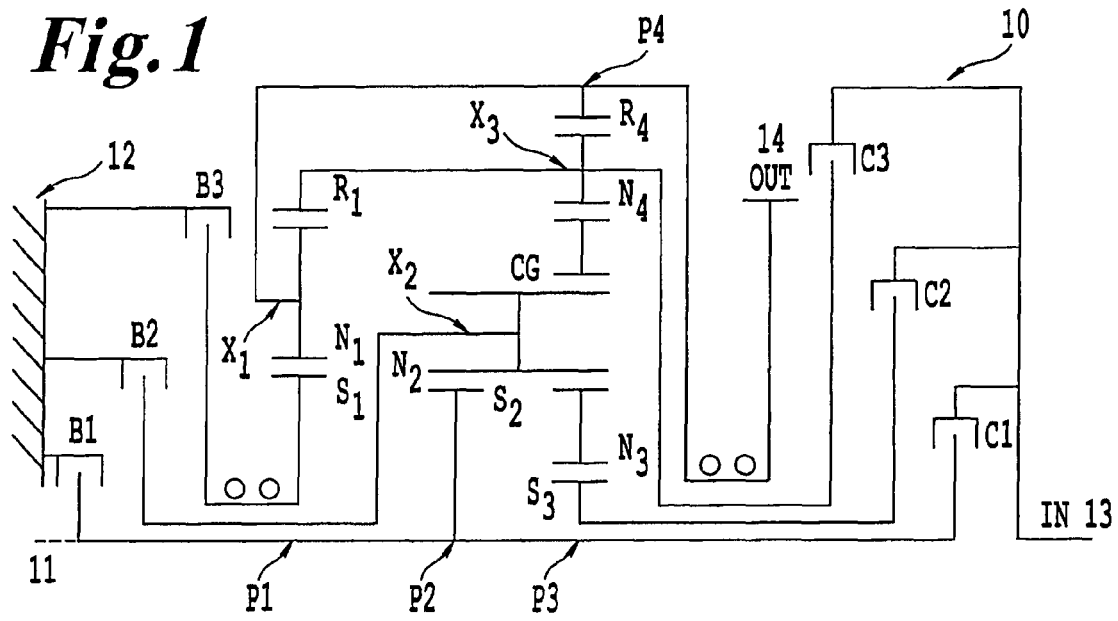
FIG. 1 is a schematic view of an illustrative automatic transmission according to an aspect of the disclosure.
FIG. 2 is a chart describing a shift pattern for the illustrative transmission as well as exemplary gear ratios and ratio steps.

Referring to the drawings, like reference numerals designate identical or corresponding parts throughout the several views.

In FIG. 1, reference numeral 10 denotes an illustrative automatic transmission that is used, for example, to transmit output rotation of a torque converter that is rotationally driven by a vehicle engine to wheels that are driven with a speed change. The automatic transmission 10 is composed of components supported about a common axis line 11 in a transmission case 12 attached to a vehicle body. These components include an input shaft 13, which may be connected to a turbine of the torque converter that is rotationally driven by the engine. These components also include a first planetary gear set P1, a second planetary gear set P2, a third planetary gear set P3, a fourth planetary gear set P4, a planetary carrier X1, a planetary carrier X2, a planetary carrier X3, a plurality of torque-transmitting elements, and an output shaft 14. The torque-transmitting elements include first, second, and third clutches C1, C2, and C3, as well as first, second, and third brakes B1, B2, and B3.

The planetary gear sets P1 to P4 are each axially arranged on the common axis line 11 in the automatic transmission. The first and the second planetary gear sets P1 and P2 are separately arranged in respective first and second gear set planes. The third and the fourth planetary gear sets P3 and P4 are arranged in a third gear set plane that is separate from the first and the second gear set planes. The third planetary gear set P3 and the fourth planetary gear set P4 are concentrically arranged with the third planetary gear set P3 being radially inward of the fourth planetary gear set P4. Thus, second gear set plane is axially positioned between the first and the third gear set planes, and the third gear set plane is a closest of the gear set planes to the input shaft 13 side of the automatic transmission.

The first planetary gear set P1 is composed of a first sun gear S1 rotatably supported on the common axis line 11, the planetary carrier X1 rotatably supporting a pinion set N1, and a ring gear R1 that meshes with the first sun gear S1 through the pinion set N1.

The second planetary gear set P2 is composed of a second sun gear S2 rotatably supported on the common axis line 11, the planetary carrier X2 rotatably supporting a long pinion set N2, and a common gear CG that meshes with the second sun gear S2 through the long pinion set N2.

The third planetary gear set P3 is composed of a third sun gear S3 rotatably supported on the common axis line 11, the planetary carrier X2 rotatably supporting the long pinion set N2, a short pinion set N3, and the common gear CG that meshes with the third sun gear S3 through the long pinion set N2 and the short pinion set N3. An axial length of the long pinion set N2 is longer than an axial length of the short pinion set N3. The second planetary gear set P2 and the third planetary gear set P3 thus form a Ravigneaux gear set.

The fourth planetary gear set P4 is composed of the common gear CG rotatably supported on the common axis line 11, a planetary carrier X3 rotatably supporting a pinion set N4, and a ring gear R4 that meshes with the common gear CG through the pinion set N4. Accordingly, a radially inward side of the common gear CG serves as the ring gear of the Ravigneaux gear set, and a radially outward side of the common gear CG serves as the sun gear of the fourth planetary gear set P4, such that the automatic transmission 10 includes an improved packaging. The fourth planetary gear set P4 may be concentric with either the second planetary gear set P2 or the third planetary gear set P3.

FIG. 1 shows a number of gear teeth of the sun gear, the ring gear, and the pinion gear(s) in the respective planetary gear sets P1 to P4. FIG. 1 also shows a gear ratio, rho, between the sun gear and the ring gear in the respective planetary gear sets P1 to P4. Thus, in an illustrative example where the sun gear S1 includes 26 gear teeth, the sun gear S2 includes 32 gear teeth, the sun gear S3 includes 29 gear teeth, and a radially outward side of the common gear CG (i.e. the sun gear of planetary gear set P4) includes 84 gear teeth, and where the ring gear R1 includes 74 gear teeth, a radially inward side of the common gear CG (i.e. the ring gear of planetary gear sets P2 and P3) includes 72 gear teeth, and the ring gear R4 includes 140 gear teeth, a value of rho for the first planetary gear set equals 0.351, a value of rho for the second planetary gear set equals 0.444, a value of rho for the third planetary gear set equals 0.403, and a value of rho for the fourth planetary gear set equals 0.600.

In the first planetary gear set P1, the first sun gear S1 is fixed through the third brake B3. The planetary carrier X1 is directly connected to the ring gear R4 and to the output shaft 14. The ring gear R1 is directly connected to the planetary carrier X3. The term "directly connected" indicates that two elements are coupled to each other without any intermediate clutch or brake.

In the second planetary gear set P2, the second sun gear S2 is fixed through the first brake B1, and the second sun gear S2 is connected to the input shaft 13 by engaging the first clutch C1. The planetary carrier X2 is fixed through the second brake B2.

In the third planetary gear set P3, the third sun gear S3 is connected to the input shaft 13 by engaging the second clutch C2.

In the fourth planetary gear set P4, the planetary carrier X3 is connected to the input shaft 13 by engaging the third clutch C3. The ring gear R4 is directly connected to the planetary carrier X1 and the output shaft 14.

Three elements of the first to third brakes B1 to B3 and the first to third clutches C1 to C3 are thus disengaged at any speed of the automatic transmission 10. Advantageously, this reduces friction within the automatic transmission. The automatic transmission 10 also includes an improved assembly and a reduced packaging size. The automatic transmission 10 provides assembly and space saving benefits, in particular, when the first to third brakes B1 to B3 and the first to third clutches C1 to C3 lie outside of a gear train formed by the planetary gear sets P1 to P4. Packaging the clutches and brakes outside of the gear train also makes it easier to supply hydraulic pressure to the clutches and brakes. Moreover, the first to third brakes B1 to B3 may be packaged in a concentric arrangement, and the first to third clutches C1 to C3 may be packaged in a concentric arrangement. Nesting torque-transmitting elements in one or more concentric arrangements further provides the automatic transmission 10 with the advantage of a reduced packaging size in an axial length of the transmission. Consequently, the automatic transmission 10 facilitates an assembly and integration of the transmission within the vehicle body.

In the automatic transmission 10 structured as described above, a rotation of the input shaft 13 is transmitted through elements of the planetary gear sets P1 to P4 and output to the output shaft 14. Selective engagement of the first to third clutches C1 to C3 and the first to third brakes B1 to B3 adjusts a rotation output to the output shaft 14, based on a speed selected from nine forward speeds and one reverse speed.

Figure 3:
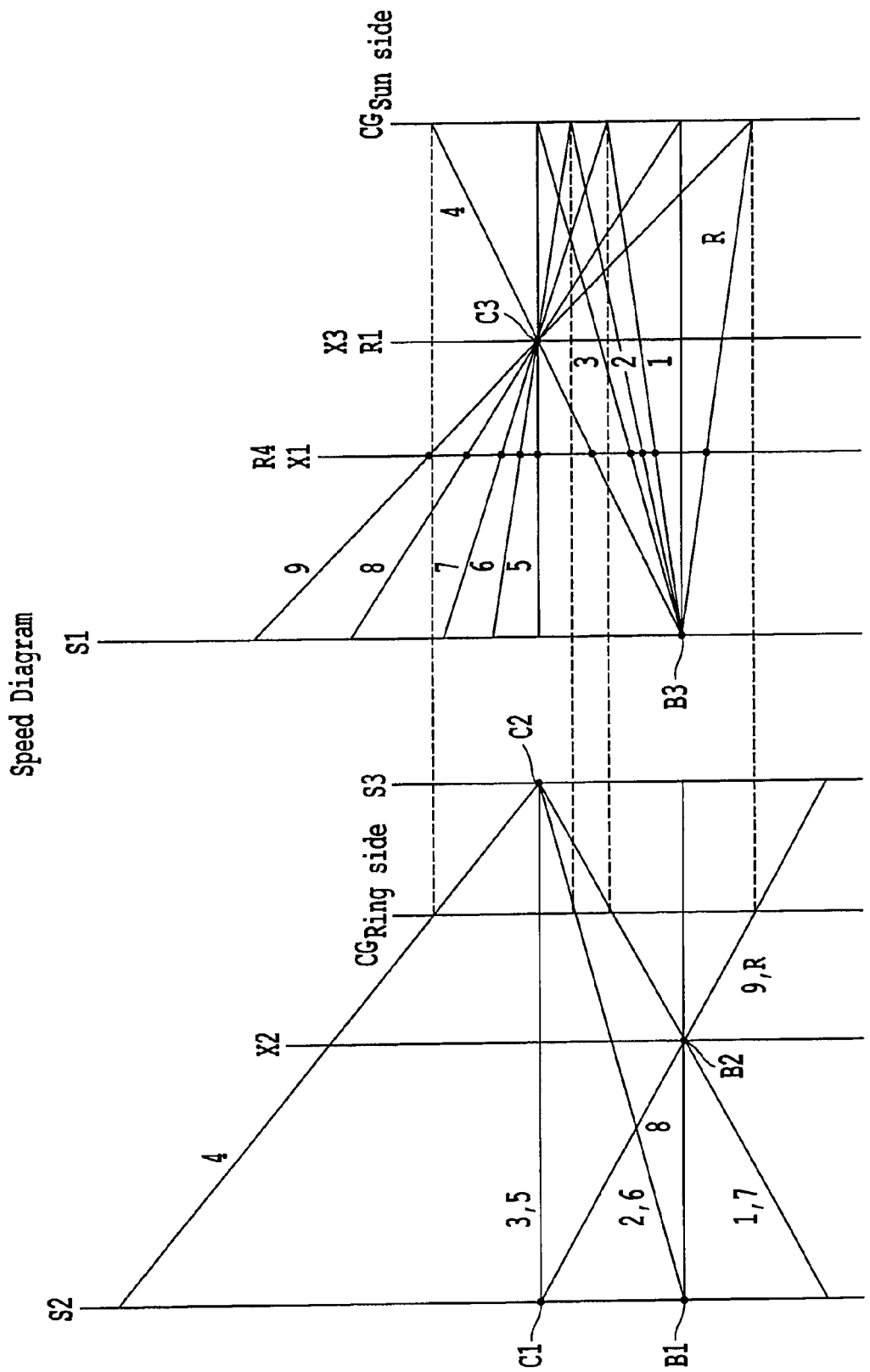
FIG. 3 is a speed diagram showing shifting processes from a first forward speed to a ninth forward speed, as well as a reverse speed, for the illustrative transmission.

More specifically, as shown in FIGS. 2 and 3, a first forward gear of the automatic transmission 10 is formed when the second brake B2, the third brake B3, and the second clutch C2 are engaged to transmit torque, while the first brake B1, the first clutch C1, and the third clutch C3 are disengaged. A second forward gear is formed when the first brake B1, the third brake B3, and the second clutch C2 are engaged to transmit torque, while the second brake B2, the first clutch C1, and the third clutch C3 are disengaged. A third forward gear is formed when the third brake B3, the first clutch C1, and the second clutch C2 are engaged to transmit torque, while the first brake B1, the second brake B2, and the third clutch C3 are disengaged. A fourth forward gear is formed when the third brake B3, the second clutch C2, and the third clutch C3 are engaged to transmit torque, while the first brake B1, the second brake B2, and the first clutch C1 are disengaged. A fifth forward gear is formed when the first clutch C1, the second clutch C2, and the third clutch C3 are engaged to transmit torque, while the first brake B1, the second brake B2, and the third brake B3 are disengaged. A sixth forward gear is formed when the first brake B1, the second clutch C2, and the third clutch C3 are engaged to transmit torque, while the second brake B2, the third brake B3, and the first clutch C1 are disengaged. A seventh forward gear is formed when the second brake B2, the second clutch C2, and the third clutch C3 are engaged to transmit torque, while the first brake B1, the third brake B3, and the first clutch C1 are disengaged. An eighth forward gear is formed when the first brake B1, the second brake B2, and the third clutch C3 are engaged to transmit torque, while the third brake B3, the first clutch C1, and the second clutch C2 are disengaged. A ninth forward gear is formed when the second brake B2, the first clutch C1, and the third clutch C3 are engaged to transmit torque, while the first brake B1, the third brake B3, and the second clutch C2 are disengaged. Additionally, a reverse gear of the automatic transmission 10 is formed when the second brake B2, the third brake B3, and the first clutch C1 are engaged to transmit torque, while the first brake B1, the second clutch C2, and the third clutch C3 are disengaged.

Figure 4:
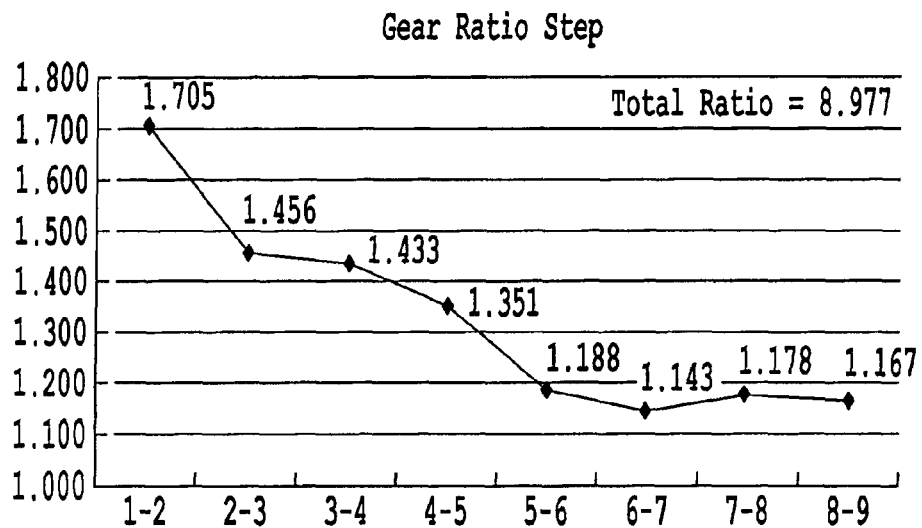
FIG. 4 is a graph showing the exemplary gear ratio steps between adjacent forward gears of the illustrative transmission.

In the automatic transmission 10, the first forward gear includes a highest forward gear ratio of the automatic transmission, while the ninth forward gear includes a lowest forward gear ratio of the automatic transmission. In an illustrative example, it is desirable that a ratio spread between the highest forward gear ratio and the lowest forward gear ratio is 8.97. As shown in FIG. 4, it is also favorable that a ratio step between any two immediately adjacent forward gear ratios of the automatic transmission 10 is less than 1.71. As a result, the automatic transmission 10 maintains a power supply device in an efficient operating condition and improves vehicle fuel efficiency. The close gear ratio steps also enable a more responsive torque demand logic and enhance vehicle drivability. Advantageously, the torque-transmitting elements in the automatic transmission 10 have low torque requirements, so that these elements are themselves reduced in size and experience lower friction.

Figure 5:
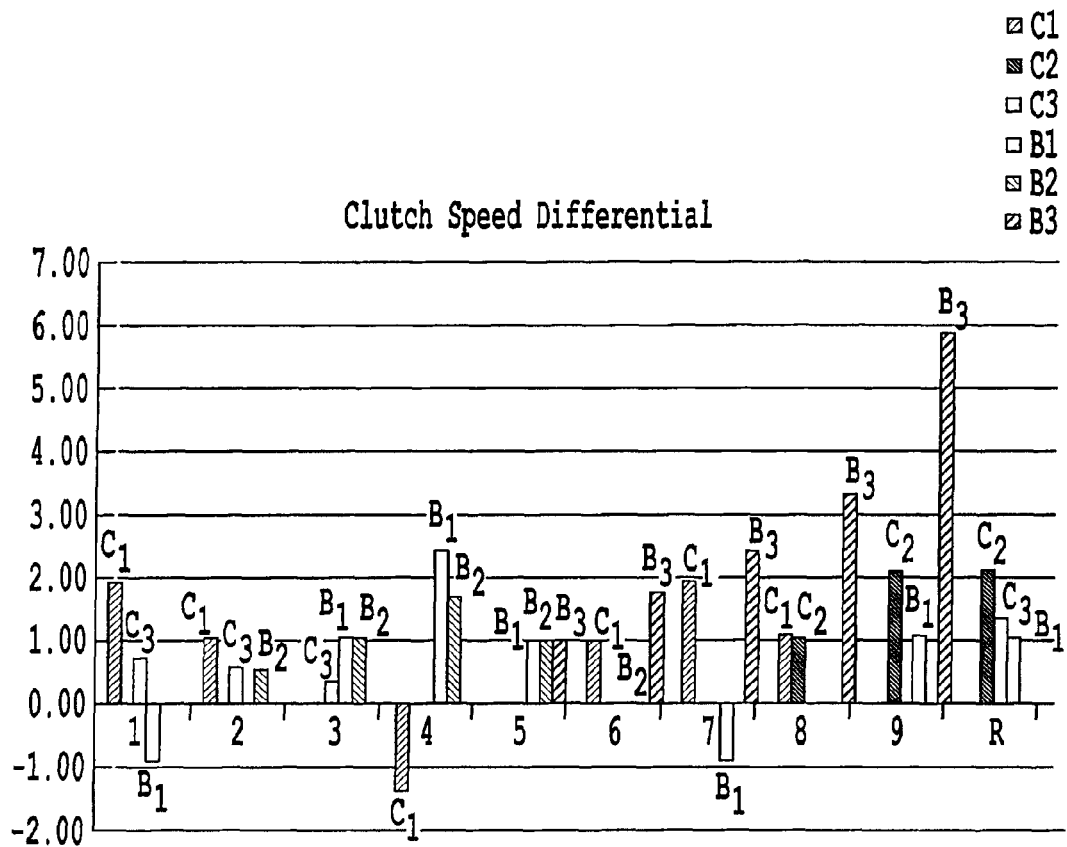
FIG. 5 is a graph showing speed differentials at the torque-transmitting elements that are disengaged in each gear of the illustrative transmission.

In FIG. 5, exemplary speed differentials at the torque-transmitting elements that are disengaged in each gear of the automatic transmission 10 are shown.

Figure 6:
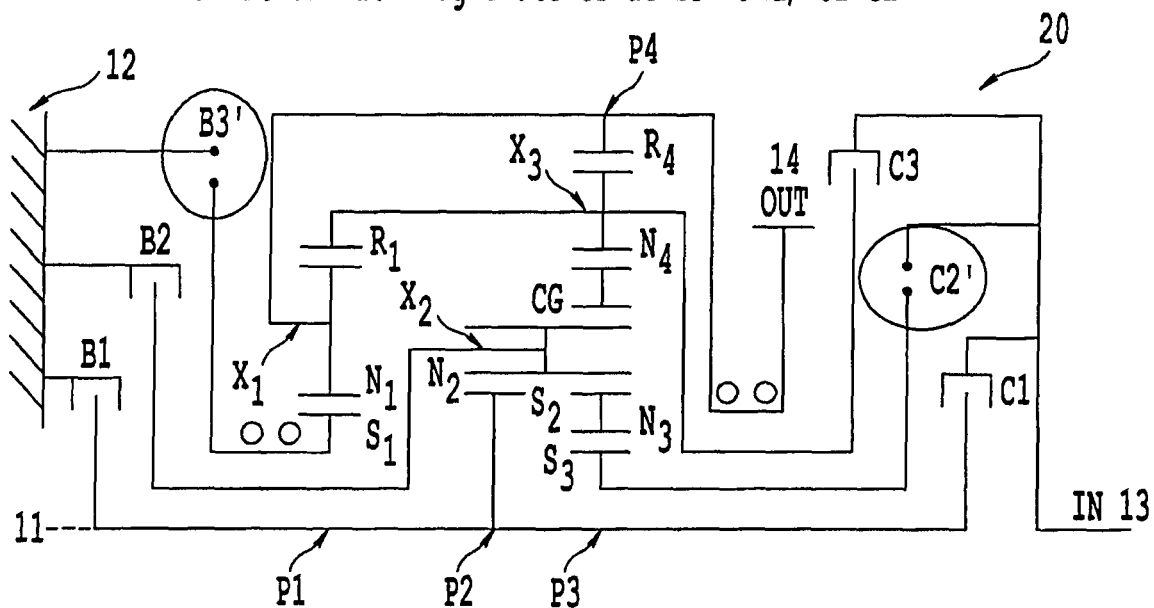
FIG. 6 is a schematic view of an illustrative automatic transmission according to a further aspect of the disclosure.

An illustrative automatic transmission 20 is depicted in FIG. 6. The automatic transmission 20 of FIG. 6 includes all the features of the automatic transmission 10 of FIG. 1, with the third brake B3' implemented as a locking clutch and/or the second clutch C2' implemented as a locking clutch. In this variation, the locking clutch may be a dog clutch instead of a higher friction multi-plate wet clutch. Each dog clutch is a low-friction element that further reduces friction within the automatic transmission 20 while also maintaining shift performance. In addition, implementing the third brake B3' as a locking clutch, for example, minimizes an efficiency concern due to a relatively high speed differential at B3, as shown in FIG. 5, of the automatic transmission 10.

The foregoing disclosure describes merely illustrative embodiments of the present invention. As will be understood by those skilled in the art, the present invention may be embodied in other specific forms without departing from the spirit or essential characteristics thereof. Accordingly, the disclosure is intended to be illustrative of the present invention, but not limiting of the scope of the invention, as well as the following claims. The disclosure and any discernible variants of the teachings herein define, at least in part, the scope of the claim terminology, such that no inventive subject matter is dedicated to the public.

The invention claimed is:
1. An automatic transmission, comprising:
a first planetary gear set including a first sun gear, a first pinion, and a ring gear of the first planetary gear set, the first sun gear meshes with the first pinion, and the first pinion meshes with the first sun gear and with the ring gear of the first planetary gear set;

a second planetary gear set including a second sun gear, a second pinion, and a common gear, the second sun gear meshes with the second pinion, and the second pinion meshes with the second sun gear and with the common gear;

a third planetary gear set including a third sun gear, the second pinion, a third pinion, and the common gear, the third sun gear meshes with the third pinion, the third pinion meshes with the third sun gear and with the second pinion, and the second pinion meshes with the third pinion and with the common gear; and a fourth planetary gear set including the common gear, a fourth pinion, and a ring gear of the fourth planetary gear set, the common gear meshes with the fourth pinion, and the fourth pinion meshes with the common gear and with the ring gear of the fourth planetary gear set;

wherein the second planetary gear set and the third planetary gear set form a Ravigneaux gear set, and the fourth planetary gear set is concentrically arranged with the second planetary gear set or with the third planetary gear set, the second and third planetary gear sets being radially inward of the fourth planetary gear set.

2. The automatic transmission of claim 1, wherein the first, the second, the third, and the fourth planetary gear sets are each axially arranged on a single axis in the automatic transmission.

3. The automatic transmission of claim 1, wherein an output shaft of the automatic transmission is directly connected to the ring gear of the fourth planetary gear set.

4. The automatic transmission of claim 1, wherein in the Ravigneaux gear set, the second pinion is a long pinion and the third pinion is a short pinion, the long pinion being longer in length than the short pinion, and a number of gear teeth of the second sun gear is greater than a number of gear teeth of the third sun gear.

5. The automatic transmission of claim 1, further comprising:
a first planetary carrier that rotatably supports the first pinion;
a second planetary carrier that rotatably supports the second pinion; and
a third planetary carrier that rotatably supports the fourth pinion.

6. The automatic transmission of claim 5, further comprising:
a first torque-transmitting element that fixes the second sun gear when the first torque-transmitting element is engaged to transmit torque;
a second torque-transmitting element that fixes the second planetary carrier when the second torque-transmitting element is engaged to transmit torque;
a third torque-transmitting element that fixes the first sun gear when the third torque-transmitting element is engaged to transmit torque;
a fourth torque-transmitting element that connects an input shaft of the automatic transmission to the second sun gear when the fourth torque-transmitting element is engaged to transmit torque;
a fifth torque-transmitting element that connects the input shaft to the third sun gear when the fifth torque-transmitting element is engaged to transmit torque; and
a sixth torque-transmitting element that connects the input shaft to the third planetary carrier when the sixth torque-transmitting element is engaged to transmit torque.

7. The automatic transmission of claim 6, wherein the first, the second, and the third torque-transmitting elements are packaged in a concentric arrangement, and the fourth, the fifth, and the sixth torque-transmitting elements are packaged in a concentric arrangement.

8. The automatic transmission of claim 6, wherein the first, the second, the third, the fourth, the fifth, and the sixth torque-transmitting elements are packaged outside of a gear train formed by the first, the second, the third, and the fourth planetary gear sets.

9. The automatic transmission of claim 6, wherein three elements of the first, the second, the third, the fourth, the fifth, and the sixth torque-transmitting elements are engaged at any speed of the automatic transmission.

10. The automatic transmission of claim 6, wherein:
the second, the third, and the fifth torque-transmitting elements are engaged in a first forward gear of the automatic transmission,
the first, the third, and the fifth torque-transmitting elements are engaged in a second forward gear of the automatic transmission,
the third, the fourth, and the fifth torque-transmitting elements are engaged in a third forward gear of the automatic transmission,
the third, the fifth, and the sixth torque-transmitting elements are engaged in a fourth forward gear of the automatic transmission,
the fourth, the fifth, and the sixth torque-transmitting elements are engaged in a fifth forward gear of the automatic transmission,
the first, the fifth, and the sixth torque-transmitting elements are engaged in a sixth forward gear of the automatic transmission,
the second, the fifth, and the sixth torque-transmitting elements are engaged in a seventh forward gear of the automatic transmission,
the first, the second, and the sixth torque-transmitting elements are engaged in an eighth forward gear of the automatic transmission,
the second, the fourth, and the sixth torque-transmitting elements are engaged in a ninth forward gear of the automatic transmission, and
the second, the third, and the fourth torque-transmitting elements are engaged in a reverse gear of the automatic transmission.

11. The automatic transmission of claim 10, wherein:
the first forward gear includes a highest forward gear ratio of the automatic transmission, and
the ninth forward gear includes a lowest forward gear ratio of the automatic transmission.

12. The automatic transmission of claim 11, wherein a ratio spread between the highest forward gear ratio and the lowest forward gear ratio is 8.97, and a ratio step between any two immediately adjacent forward gear ratios of the automatic transmission is less than 1.71 and greater than 1.14.

13. The automatic transmission of claim 6, wherein at least one of the third torque-transmitting element and the fifth torque-transmitting element is a locking clutch.

14. The automatic transmission of claim 13, wherein the locking clutch is a dog clutch.

* * * * *